United States Patent [19]
Filippi et al.

[11] Patent Number: 6,038,961
[45] Date of Patent: Mar. 21, 2000

[54] FLUSH MOUNT REMOTE SEAL

[75] Inventors: Giovanni Filippi, Brenham, Tex.;
Rudolphus Louis Maria van Os,
Wuustwezel, Belgium

[73] Assignee: Rosemount Inc., Eden Prairie, Minn.

[21] Appl. No.: 09/033,374

[22] Filed: Mar. 2, 1998

[51] Int. Cl.[7] .................................................. F15B 19/00
[52] U.S. Cl. ............................. 92/98 R; 92/102; 29/454
[58] Field of Search ........................... 92/98 R, 96, 102;
29/454; 73/706, 715, 718

[56] References Cited

U.S. PATENT DOCUMENTS

| | | | |
|---|---|---|---|
| 3,072,150 | 1/1963 | Hastings et al. | 92/98 R |
| 3,675,540 | 7/1972 | Murata et al. | 92/98 |
| 4,046,010 | 9/1977 | Akeley | 73/406 |
| 4,072,057 | 2/1978 | Yasuhara et al. | 73/718 |
| 4,136,603 | 1/1979 | Doyle, Jr. | 92/98 |
| 4,169,389 | 10/1979 | Yasuhara et al. | 73/718 |
| 4,262,540 | 4/1981 | Tamai et al. | 73/718 |
| 4,370,890 | 2/1983 | Frick | 73/718 |
| 4,563,697 | 1/1986 | Miura | 357/26 |
| 4,720,079 | 1/1988 | Iizuka et al. | 251/331 |
| 4,787,250 | 11/1988 | Varrese | 73/715 |
| 4,833,922 | 5/1989 | Frick et al. | 73/756 |
| 4,872,335 | 10/1989 | Tsuruoka et al. | 73/30 |
| 5,042,308 | 8/1991 | Nakamura et al. | 73/718 |
| 5,056,369 | 10/1991 | Tamai et al. | 73/718 |
| 5,094,109 | 3/1992 | Dean et al. | 73/718 |
| 5,184,514 | 2/1993 | Cucci et al. | 73/706 |
| 5,230,248 | 7/1993 | Cucci et al. | 73/706 |
| 5,335,549 | 8/1994 | Kato | 73/706 |
| 5,400,655 | 3/1995 | Tamai et al. | 73/706 |
| 5,524,492 | 6/1996 | Frick et al. | 73/706 |
| 5,551,299 | 9/1996 | Tamai et al. | 73/706 |
| 5,602,338 | 2/1997 | Tamai et al. | 73/716 |

FOREIGN PATENT DOCUMENTS

| | | |
|---|---|---|
| 0 607 482 B1 | 7/1994 | European Pat. Off. . |
| WO 96/27124 | 9/1996 | WIPO . |

OTHER PUBLICATIONS

"Diaphragm Seals", by Innovations by P I Components, pp. 1–16, 1997.
"Model 3051C With 1199", Product Data Sheet PDS 4672, by Rosemount Inc., pp. 1–16 and 19, 1990, 1992.
"The Ultimate Chemical Seal Program", by Senpro, pp. 1–112, Feb. 1993.
"Improved Design and Mounting of Remote Seal Liquid Level Transmitters", by H. R. Jaquith, *Advances in Instrumentation and Control*, Part 2, pp. 1149–1160, (1992).

*Primary Examiner*—Hoang Nguyen
*Attorney, Agent, or Firm*—Westman, Champlin & Kelly, P.A.

[57] ABSTRACT

A method of manufacturing a remote seal of the type used in the process control industry includes welding a circular metal sheet of a material fusible to a housing. The sheet has a hole formed therein with an inner diameter. The method further including attaching a diaphragm made of a metal to the sheet along the inner diameter of the hole in the sheet. A remote seal includes a flange face and a disc attached to the flange. The disc includes an inner diameter. The remote seal further includes a diaphragm attached to the disc along the inner diameter of the disc.

15 Claims, 4 Drawing Sheets

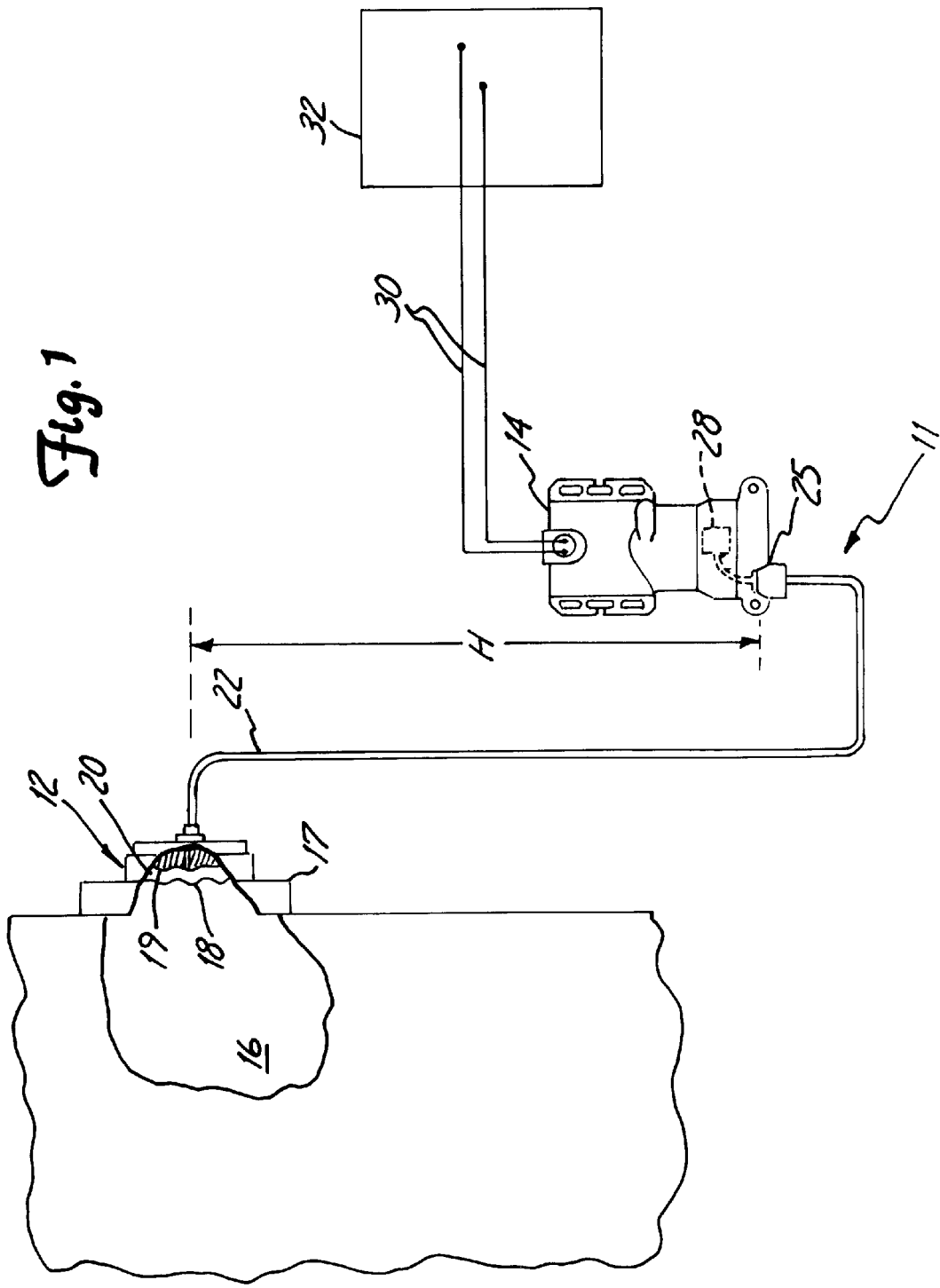

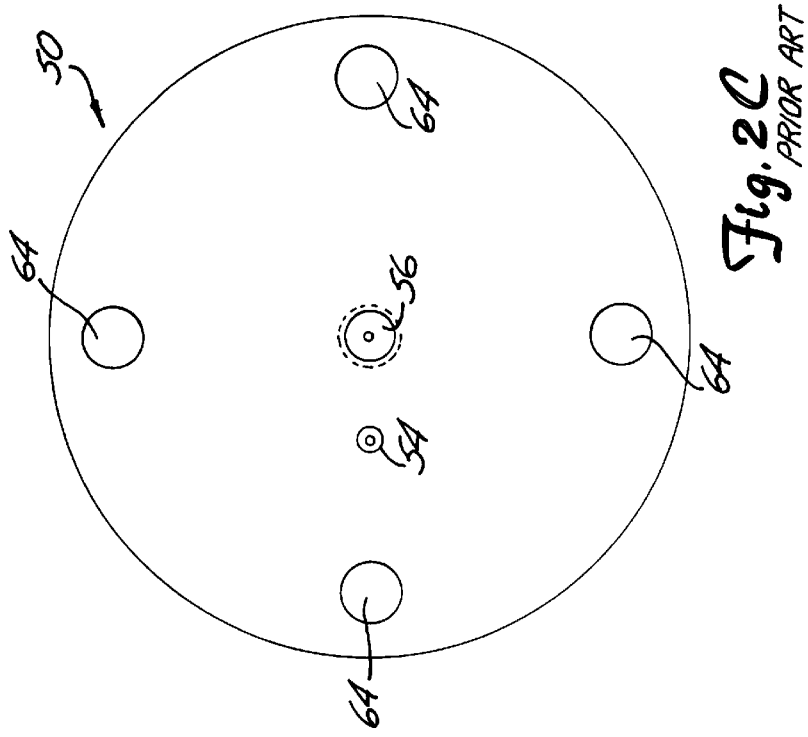
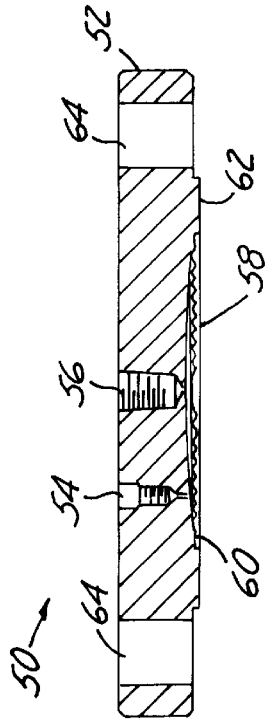
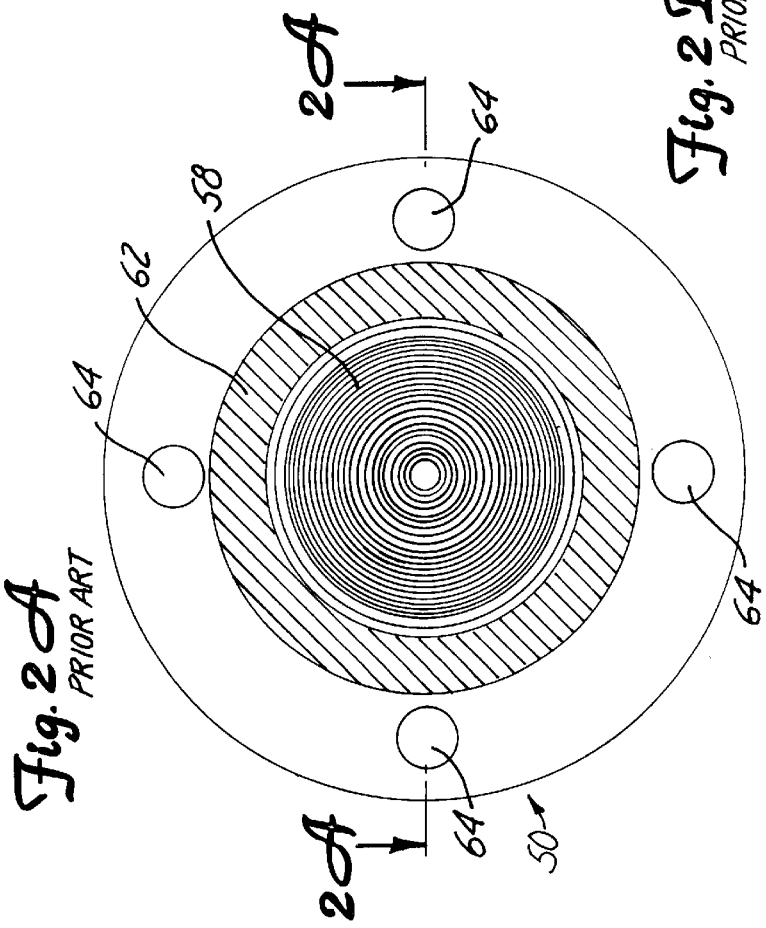
Fig. 2A PRIOR ART
Fig. 2B PRIOR ART
Fig. 2C PRIOR ART

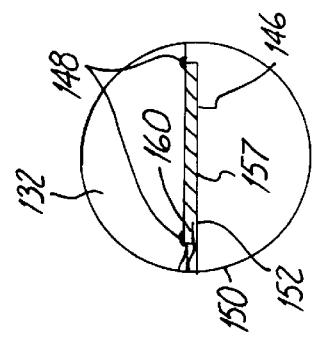
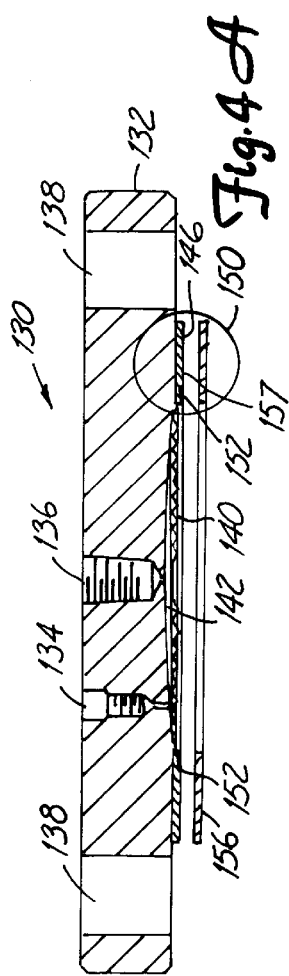
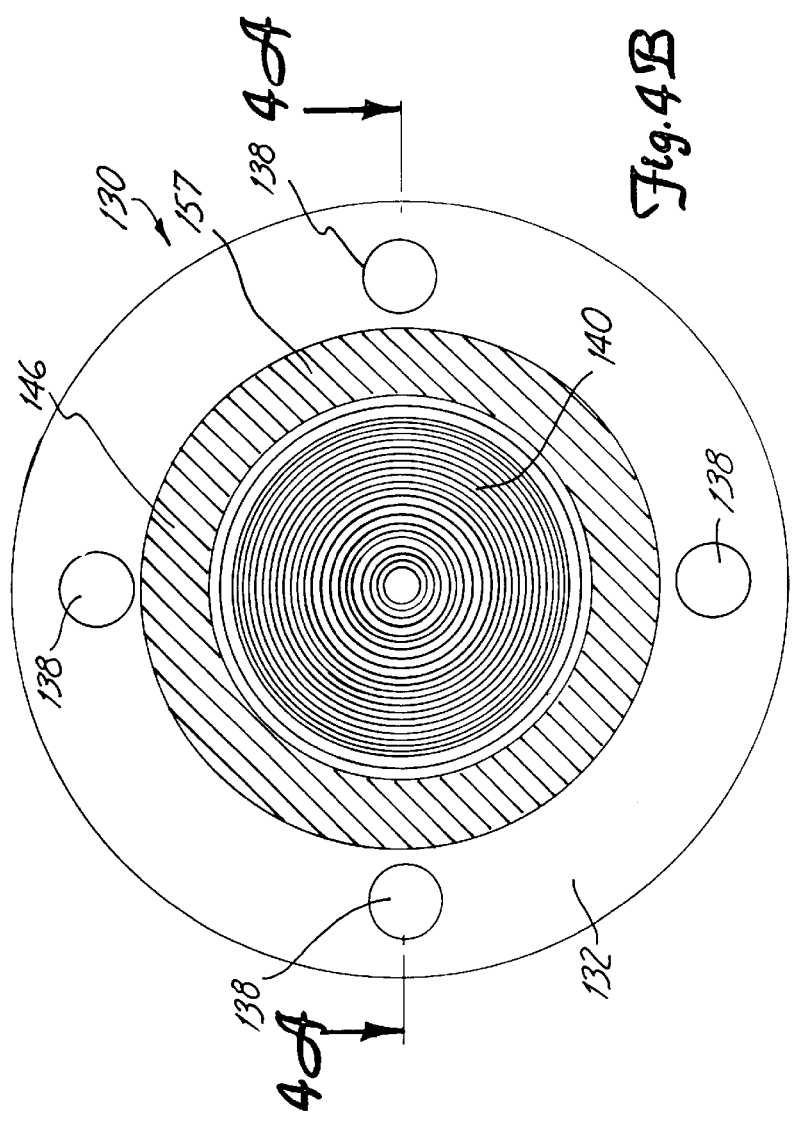

FLUSH MOUNT REMOTE SEAL

BACKGROUND OF THE INVENTION

The present invention relates to the process control industry. More specifically, the present invention relates to an isolation diaphragm or seal, of the type used to couple a process control instrument to a process.

Some types of process control instruments, such as pressure transmitters, have a pressure sensor which is fluidically coupled to an isolation diaphragm by a fill fluid. The isolation diaphragm comprises part of a subassembly called a "remote seal" or a "diaphragm seal" and isolates the pressure sensor from corrosive process fluids being sensed. Pressure is transferred from the isolation diaphragm to the sensor through the fill fluid which is substantially incompressible and fills cavities on both sides and a capillary tube (or thru-hole if the seal is directly mounted to the instrument). The tube is typically flexible and may extend for several meters. The process medium contacts the remote isolation diaphragm which conveys the exerted pressure to the pressure sensor disposed in the transmitter housing.

Typically, the isolation diaphragm and any process-watted parts of the remote seal are made of a corrosion resistant material such that the process medium does not damage the diaphragm. However, the housing of the remote seal may partially contact the process medium as well. Therefore, it is necessary that the housing of the remote seal be protected from contact with the process medium or otherwise be corrosion resistant. The prior art has attempted to protect the housing of the remote seal using a number of techniques.

One type of prior art seal is known as an "extended seal" and includes a stainless steel tube welded to a stainless steel flange. A Hastelloy end cap which carries a Hastelloy diaphragm is welded to the stainless steel tube opposite the flange. A tubular sheet of Hastelloy fits over the stainless steel tube and is welded to the end cap. A disc of Hastelloy is banded to the flange and to the tubular sheet and covers the flange. The Hastelloy disc and the tubular sheet typically have a thickness of between 1/64 and 3/16 inches. However, such an extended seal requires sufficient room to accommodate the tube and may not be used in all installations.

SUMMARY OF THE INVENTION

A method of manufacturing a remote seal of the type used in the process control industry includes welding a circular fusible metal sheet to a housing (flange). The sheet has a hole formed therein with an inner diameter. The method further includes attaching a diaphragm made of a metal to the sheet proximate to the inner diameter of the hole in the sheet. An apparatus in accordance with the present invention includes a remote seal having a housing and a fusible metal disc attached to the housing. The disc is of thin sheet metal and includes an inner and an outer diameter. The remote seal further includes a diaphragm attached to the disc along the inner diameter of the disc.

BRIEF DESCRIPTION OF THE DRAWINGS

FIG. 1 is a simplified diagram showing a transmitter having a remote seal in accordance with the present invention.

FIG. 2A is a side cross-sectional view taken along a line labeled 2A—2A in FIG. 2B, of a prior art remote seal.

FIG. 2B is a bottom plan view of the prior art remote seal in FIG. 2A.

FIG. 2C is a top plan view of the prior art remote seal of FIG. 2A.

FIG. 4A is a side cross-sectional view taken along a line labeled 4A—4A in FIG. 4B, of a remote seal in accordance with the present invention.

FIG. 4B is a bottom plan view of the remote seal of FIG. 4A.

FIG. 4C is an enlarged view of an inset of the remote seal shown in FIG. 4A.

DETAILED DESCRIPTION OF THE PREFERRED EMBODIMENTS

Figures 3A, 3B:
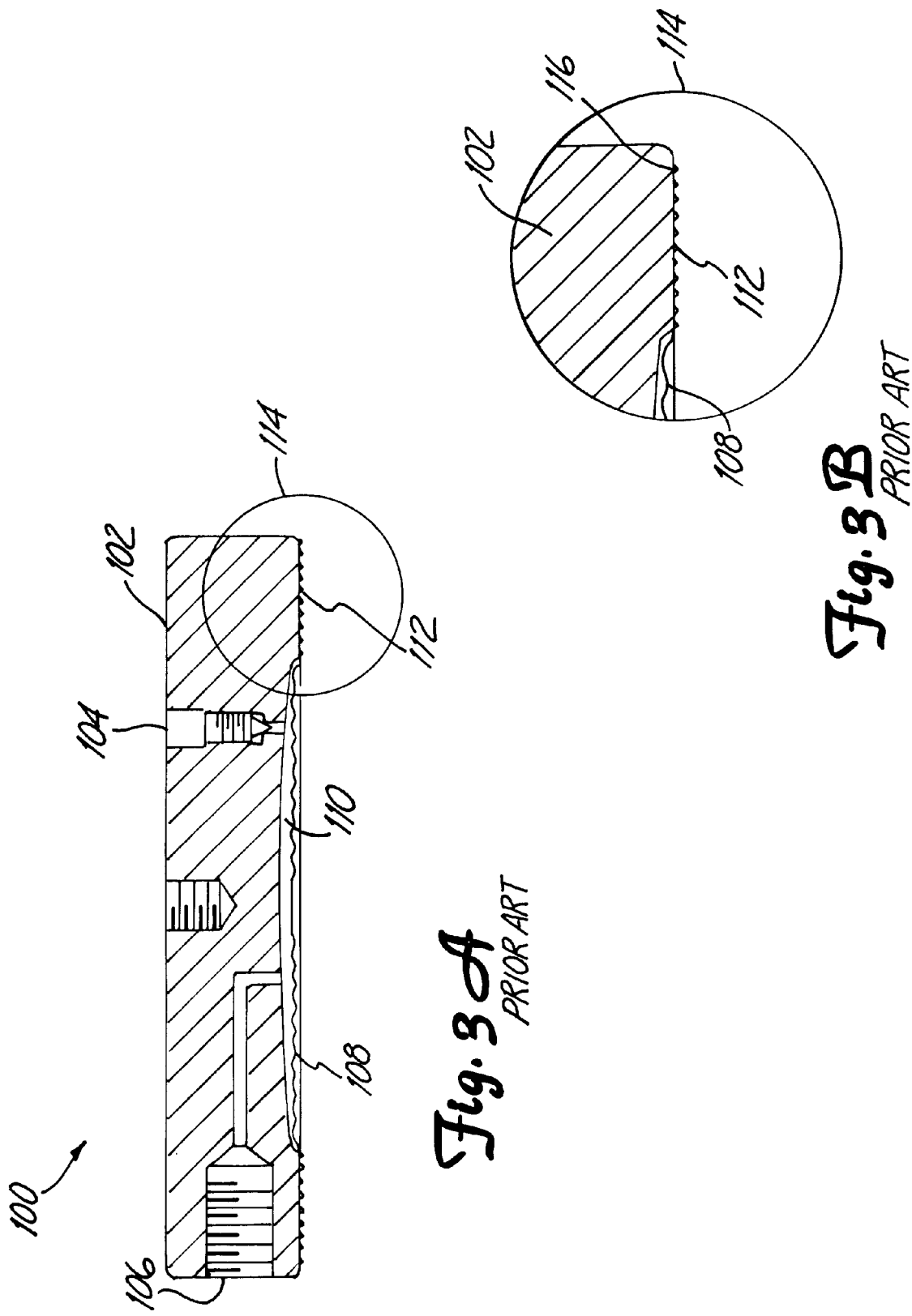
FIG. 3A is a side cross-sectional view of a prior art remote seal.
FIG. 3B is an enlarged portion of an inset of the prior art remote seal shown in FIG. 3A.

The present invention is a flanged flush-diaphragm mount remote seal 12 (may be flanged-flush or "pancake style") which may be used with a transmitter 11 as shown in FIG. 1. Remote seal 12 is connected to transmitter diaphragm in housing 14. Remote seal 12 of the present invention includes a housing 17 which is protected from contact with process fluid 16 (as shown in FIG. 1). The present invention provides reduced manufacturing and material costs in comparison with typical prior art techniques while allowing the placement of a machined gasket surface onto the seal. Remote seals are typically used in a number of instances with process instrumentation. For example, a remote seal can be used to protect the electronics and the sensors which are used in the transmitter from extremely hot, cold or corrosive process media. A remote seal may also be used to allow the pressure measuring device to be mounted remotely from the measurement point while keeping the process contained at the process connection. Additionally, remote seals may be used to sense pressures in viscous processes that would otherwise clog an instrument or process.

Transmitter 11 measures the pressure of process medium 16. Remote seal 12 includes a thin flexible diaphragm 18 which contacts process medium 16. Seal 12 also includes backplate 19 which, together with diaphragm 18, define cavity 20. Capillary tube 22 couples cavity 20 to pressure sensor 28 disposed in transmitter housing 14, such coupling being made via transmitter housing diaphragm 25 and a sealed fluid system connecting diaphragm 25 with sensor 28. The sealed fluid system, as well as cavity 20 and capillary tube 22, is filled with a suitable fluid for transmitting the process pressure to sensor 28. The fluid may include silicone, oil, glycerin and water, propylene glycol and water, or any other suitable fluid which preferably is substantially incompressible.

When process pressure is applied from process medium 16, diaphragm 18 displaces fluid, thereby transmitting the measured pressure from remote seal 12 through a passage in plate 19 and through tube 22 to pressure sensor 28. The resulting pressure applied to pressure sensor 28, which can be a capacitance-based pressure cell, causes such capacitance to change as a function of the pressure at medium 16. Sensor 28 can also operate on other known sensing principles, such as strain gauge technology. Circuitry within transmitter housing 14 electronically converts the capacitance into a linear 4–20 mA transmitter output signal over wire pair 30 related to the process pressure.

Remote seal 12 is referred to as a "flanged flush-diaphragm seal". Diaphragm 18 is preferably fabricated of a material which is resistant to corrosion from the process fluid. However, one problem which the prior art has attempted to address is the corrosive effects of the process fluid on the seal housing 17 where remote seal 12 couples to process medium 16.

FIG. 2A is a side cross-sectional view, FIG. 2B is a bottom plan view and FIG. 2C is a top plan view of a prior art remote seal 50. Remote seal 50 is referred to as a, "flanged-flush design" and includes seal housing 52. Remote seal 50 also includes a hydraulic fluid (fill fluid) fill port 54, an instrument connection 56, and a flexible diaphragm 58 which is welded by TIG weld 60. Surface 62 provided which is an annular shape and extends around diaphragm 58. Bolt holes 64 are used for coupling housing 52 to, for example, a tank filled with process fluid.

Typically, housing 52 is formed from stainless steel and has a thickness of about 1 inch. Housing 52 is machined in a manner to be welded to the circular metal diaphragm 58. Gasket surface 62 is also machined on housing 52. Diaphragm 58 is typically a foil diaphragm that may be cut and formed with a die press.

The prior art embodiment of seal 50 shown in FIGS. 2A–C may be built out of stainless steel if seal 50 is not exposed to processes which are corrosive to stainless steel. If the process medium is capable of corroding stainless steel, the stainless steel housing 52 will be damaged and may leak process fluid. This problem may be overcome if the housing 52 is made from a corrosion resistant material, for example, the same material used to fabricate diaphragm 58. Thus, the process fluid will not damage body 52. However, this prior art embodiment is undesirable because the corrosion resistant material used to fabricate body 52 is relatively expensive and difficult to machine.

FIG. 3A is a side cross-sectional view of a prior art remote seal 100. Remote seal 100 includes housing 102, fill fluid connection 104 and instrument connection 106. Flexible diaphragm 108 has an outer diameter which is greater than the diameter of cavity 110 such that an overlap portion 112 of diaphragm 108 covers a portion of body 102 beyond the outer diameter of cavity 110. FIG. 33 is an enlarged cross-sectional view of inset 114 shown in FIG. 3A. Portion 112 is coupled to body 102 by a bonding material such as an adhesive 116 or through brazing 116, seam-welding, TIG welding or laser welding. Portion 112 thereby provides a gasket surface for coupling to a gasket. Portion 112 is fabricated of the same sheet of corrosion resistant material used to fabricate diaphragm 108 such that portion 112 protects housing 102 from corrosion due to process fluid. Diaphragm 108 and portion 112 are formed as an integral part out of the sheet of material. The material used to form diaphragm 108 and portion 112 is typically a foil between about 0.002 inches and about 0.004 inches thick. However, in the embodiments of FIGS. 3A and 3B, portion 122 may be damaged by contact with the gasket material. This can allow process fluid to leak past portion 112 and contact body 102 thereby leading to a process leak. This design also does not allow for a "machined" gasket surface, as the foil is too thin.

FIG. 4A is a side cross-sectional view and FIG. 4B is a bottom plan view of a remote seal 130 in accordance with the present invention. Remote seal 130 includes housing (flange) 132 which typically comprises stainless steel fluid filling connection 134 and instrument connection 136. Bolt holes 138 are provided for coupling remote seal 130 to, for example, a standard ANSI flange on a process tank. Remote seal 130 also includes flexible diaphragm 140 which seals cavity 142 from the process side. In accordance with the present invention, a weld ring or disc 146 is provided and extends around the outer diameter of cavity 142. Disc 146 has an inner diameter which is substantially congruous with cavity 142 and diaphragm outer diameter. FIG. 4C is an enlarged cross-sectional view of inset 150 shown in FIG. 4A.

Disc 146 provides a gasket surface which is adaptable to mate to a gasket 156 to thereby seal against a process flange. Disc 146 is preferably formed of a corrosion resistant material, for example, the same material used to fabricate diaphragm 140. Disc 146 is coupled to body 132 by welds 148. Welds 148 may comprise, for example, TIG welds. Similarly, diaphragm 140 may be welded to disc 146, using TIG welds 152, for example.

Disc 146 is preferably made out of sheet plate metal. However, disc 146 is sufficiently thin (between about $\frac{1}{64}$" and $\frac{3}{16}$") to substantially reduce material costs. A seal surface 157 of disc 146 is preferably machined in a manner to seal to gasket 156 when the remote seal is in operation. In one embodiment, the machining is performed after disc 146 is welded to housing 132. Further, a diaphragm lip or weld detail 160 is machined into disc 157 to accommodate the outer diameter of diaphragm 140. The inner and outer diameters of disc 146 are preferably machined using the same techniques. Such machining is preferably through direct cutting techniques in a lathe with several sheets affixed to a support fixture to allow them to be machined in the lathe without being crushed. Other types of machining techniques include EDM, high pressure water, or laser machining. The various bonds used herein may be, brazing, solder, adhesive, etc. Disc 146 may be formed from a thin piece of corrosion resistant material such as any "fusible metal" which is defined herein as comprising the Unified Numbering System metals: N10276; N06022; N10665; N06600; N02200; N04400; and N08020. The surface of disc 146 may be machined with a desired finish to interface with various gasket materials and industry standards. Disc 146 is preferably made of a fusible metal material which has a melting point which is within +/−300° F. of the melting point of the housing 132.

Although the present invention has been described with reference to preferred embodiments, workers skilled in the art will recognize that changes may be made in form and detail without departing from the spirit and scope of the invention.

What is claimed is:

1. A method of manufacture for a remote seal, the method comprising:

welding a fusible metal disc of material having a thickness of between about $\frac{1}{64}$ inches and about $\frac{3}{16}$ inches to a flange, the metal disc having a hole therein with an inner diameter substantially congruous with an outer diameter of a cavity in the flange, the metal disc and the flange having melting points such that the two may be TIG welded together, whereby disc material may be fused with common TIG welding techniques; and attaching an outer diameter of a diaphragm made of the same metal as the fusible metal disc to the disc proximate to the inner diameter of the disc such that the diaphragm covers the hole in the disc but exposes a flat portion of the disc.

2. The method of claim 1 further comprising, machining the flat portion of the disc following the step of welding to provide a finished surface suitable for sealing with a gasket.

3. The method of claim 1 wherein the step of attaching the diaphragm comprises TIG welding the diaphragm to the disc.

4. The method of claim 1 including machining the inner diameter of the fusible metal disc prior to the step of welding the diaphragm.

5. The method of claim 4 wherein the step of machining comprises laser machining.

6. The method of claim 4 wherein the step of machining comprises application of a high pressure liquid.

7. The method of claim 4 wherein the step of machining comprises direct cutting on a lathe.

8. The method of claim 7 including placing the disc on a support during the step of machining.

9. The method of claim 8 including placing a plurality of discs on the support.

10. The method of claim 1 including machining a weld detail on the disc inner diameter.

11. A remote seal, comprising:

a body having a cavity formed therein;

a substantially flat disc having a thickness of between about 1/64 inches and about 3/16 inches made of a metal which is fusible to the body, the disc having an inner diameter substantially congruous with the outer diameter of the cavity of the body; and a diaphragm having an outer diameter attached to the disc proximate to the inner diameter to thereby expose a flat portion of disc.

12. The remote seal of claim 11 wherein the flat portion of the disc is machined to provide a finished surface suitable for sealing.

13. The remote seal of claim 11 wherein the diaphragm is attached to the disc by a TIG weld.

14. The remote seal of claim 11 wherein the disc has a melting point of +/−300° F. of a melting point of the body.

15. The remote seal of claim 11 wherein the disc inner diameter includes a diaphragm weld detail machined therein.

* * * * *